(12) United States Patent
Winick et al.

(10) Patent No.: US 7,081,813 B2
(45) Date of Patent: Jul. 25, 2006

(54) HOME SECURITY SYSTEM WITH VEHICLE INTERFACE, AND REMOTE VEHICLE MONITOR

(75) Inventors: Steven J. Winick, Woodmere, NY (US); Michael T. Spoltore, Valley Stream, NY (US); Robert J. Orlando, Nesconset, NY (US); Robert S. Adonailo, Rockville Centre, NY (US); Scott Simon, Melville, NY (US)

(73) Assignee: Honeywell International, Inc., Morristown, NJ (US)

( * ) Notice: Subject to any disclaimer, the term of this patent is extended or adjusted under 35 U.S.C. 154(b) by 84 days.

(21) Appl. No.: 10/732,116

(22) Filed: Dec. 10, 2003

(65) Prior Publication Data

US 2005/0128068 A1 Jun. 16, 2005

(51) Int. Cl.
*G08B 19/00* (2006.01)
(52) U.S. Cl. .................. 340/521; 340/426.1; 701/1
(58) Field of Classification Search ............... 340/521, 340/426.1, 426.28, 500, 539.1, 539.14, 541, 340/542, 628, 531; 701/1
See application file for complete search history.

(56) References Cited

U.S. PATENT DOCUMENTS

| | | | |
|---|---|---|---|
| 5,319,698 A * | 6/1994 | Glidewell et al. ............ 379/39 |
| 6,756,896 B1 * | 6/2004 | Ford .......................... 340/506 |
| 6,873,256 B1 * | 3/2005 | Lemelson et al. ........ 340/539.1 |
| 2002/0116117 A1 * | 8/2002 | Martens et al. ............. 701/115 |
| 2003/0117261 A1 * | 6/2003 | Gunsch ...................... 340/5.25 |
| 2003/0158635 A1 * | 8/2003 | Pillar et al. ..................... 701/1 |

OTHER PUBLICATIONS

"Car alarm Mannix Alarm"; printed from www.jjelectronics4u.com/caralarm.html on Nov. 25, 2003.

* cited by examiner

*Primary Examiner*—Phung T. Nguyen
(74) *Attorney, Agent, or Firm*—Scully, Scott, Murphy & Presser, P.C.

(57) ABSTRACT

A home or other building security system is interfaced with a vehicle control system, such as for an automobile. The vehicle control system includes a transceiver for receiving commands from the home security system for performing certain actions, such as arming or disarming an alarm system, unlocking or locking doors, opening or closing windows, and starting or stopping the engine. The vehicle control system also transmits status information regarding the vehicle to the home security system. The vehicle can be protected as a zone or partition of the home security system. Furthermore, a remote vehicle monitoring apparatus may be provided that triggers an alarm or annunciation based on its control mode when a change of status signal is received from the vehicle. The control mode is optionally tied to the status of a home security system.

37 Claims, 4 Drawing Sheets

HOME SECURITY SYSTEM WITH VEHICLE INTERFACE, AND REMOTE VEHICLE MONITOR

BACKGROUND OF THE INVENTION

1. Field of Invention

The invention relates generally to security systems for homes and vehicles and, more particularly, to a home security system with a vehicle interface, and a remote vehicle monitor.

2. Description of Related Art

Security systems for homes and vehicles have become commonplace as people seek to protect themselves and their property. Home security systems typically employ sensors at entry points, such as windows and doors, along with interior sensors such as motion detectors and glass break detectors. A control panel allows the user to arm and disarm the system, such as by entering a password on a keypad. In addition to sounding a local alarm, the home security system may include a telephone dialer for informing the authorities of an alarm in the home. Moreover, alarm systems for vehicles such as automobiles similarly employ sensors to determine whether a door, trunk, or hood is opened, whether glass is broken, whether the engine is started, and so forth. However, the respective home and vehicle alarm systems have heretofore operated independently. Moreover, a remote vehicle monitoring solution is needed.

BRIEF SUMMARY OF THE INVENTION

To overcome these and other deficiencies in the prior art, the present invention describes a system wherein a home security system and vehicle security system interface with one another, and a remote vehicle monitor is provided.

Many advantages can be achieved by integrating home and vehicle security systems. For example, the invention can be used to alert a user, via a home security system user interface, to the fact that his or her vehicle is in jeopardy, as well as provide other status information to the user regarding, e.g., whether an alarm is armed, an engine is running, or a door or window is open in the vehicle. The invention also enables the user to control different components in the vehicle, such as components for locking or unlocking doors, arming or disarming an alarm system, or starting or stopping the vehicle's engine. A capability may be provided to enable the user to access the home security system remotely, such as from the user's office, to obtain the vehicle status information or control the vehicle's components. A hardwired or wireless keypad, key fob, downloader software, or a voice telephone module may be employed for these purposes. Other features will be apparent in view of the detailed discussion below.

In one aspect of the invention, a security apparatus includes at least one receiver for receiving at least one signal from at least one sensor for detecting an alarm condition in a building, and for receiving at least one wireless signal from a security system in a vehicle, and a control responsive to the at least one receiver for determining whether to trip an alarm according to the at least one signal from the at least one sensor and the at least one wireless signal from the security system in the vehicle.

In a further aspect of the inventions, a security apparatus includes at least one receiver for receiving at least one signal from at least one sensor that detects an alarm condition in a building, and for receiving at least one wireless signal from a vehicle that provides status information of the vehicle, a control responsive to the receiver, and a transmitter responsive to the control for transmitting at least one wireless signal to the vehicle comprising at least one command for controlling at least one component in the vehicle.

In a further aspect of the invention, a security apparatus includes at least one receiver for receiving at least one wireless signal from a vehicle when the vehicle is within a range of the receiver, e.g., the receiver is close enough to the vehicle to receive the signal. A control responsive is to the receiver for determining when the vehicle is within the range of the receiver, and a transmitter responsive to the control for transmitting at least one wireless signal to the vehicle comprising at least one command for controlling at least one component in the vehicle when the control determines that the vehicle is within the range of the receiver.

In a further aspect of the invention, a vehicle security apparatus includes a vehicle control system for maintaining status information of the vehicle, a transmitter responsive to the system for transmitting at least one wireless signal that provides the status information to a receiver of a security system, the security system detecting intrusion in a building, and a receiver for receiving at least one wireless signal from the security system comprising at least one command for controlling at least one component in the vehicle. The vehicle control system is responsive to the receiver for controlling the at least one component according to the at least one command.

In yet another aspect of the invention, a vehicle monitoring apparatus includes at least one receiver for receiving at least one wireless signal from a vehicle indicating a change in status of the vehicle, and a control responsive to the at least one receiver for notifying a user, in accordance with a control mode, when the at least one wireless signal from the vehicle indicates that the change in status of the vehicle has been detected.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
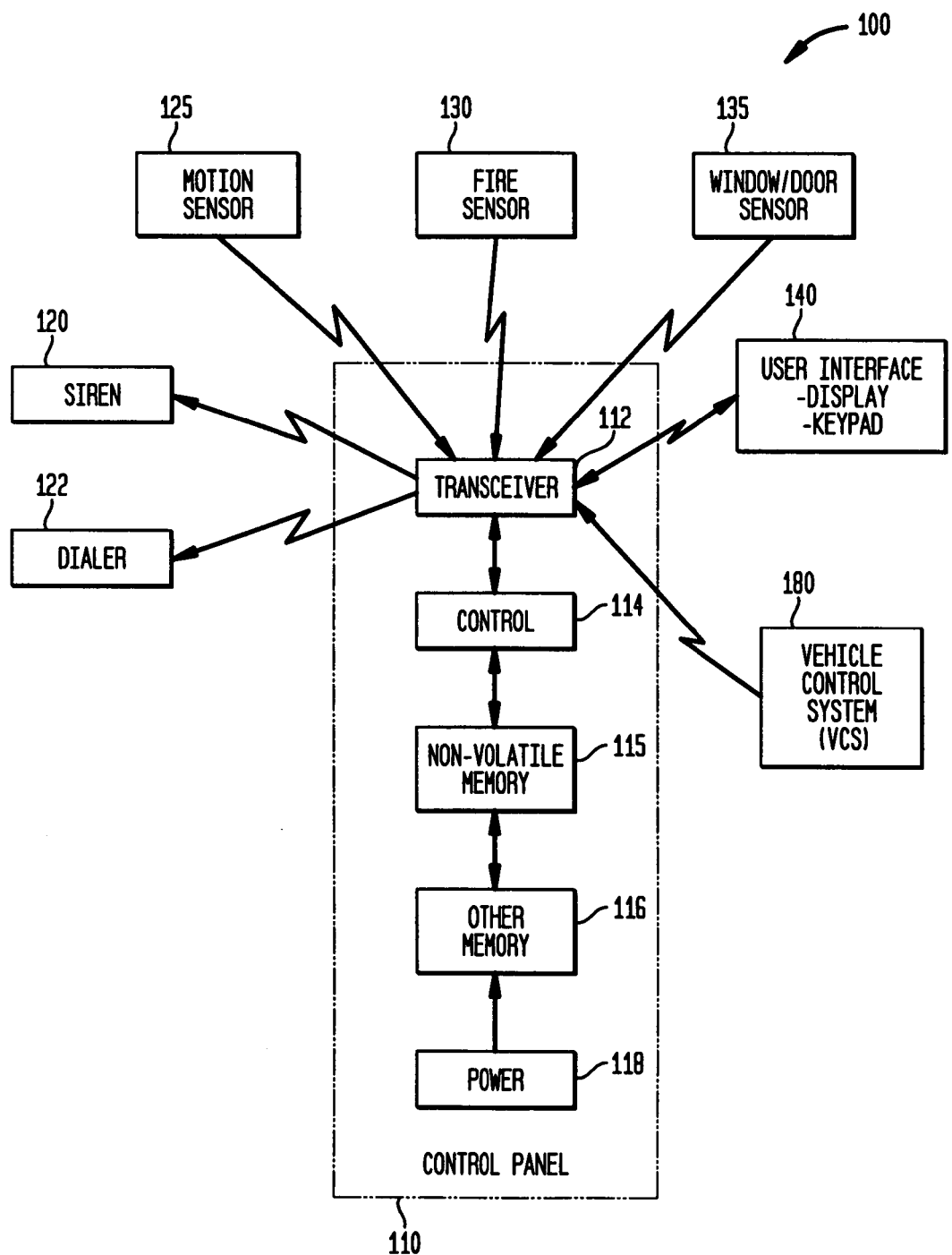
FIG. 1 illustrates an overview of an example security system that interfaces with a vehicle control system, according to the invention.

FIG. 1 illustrates an overview of an example security system that interfaces with a vehicle control system, according to the invention. Many buildings such as homes and small businesses today are equipped with security systems to deter burglaries and detect fires. The term "security" thus encompasses security from intrusion as well as fire. Other hazards such as carbon monoxide may also be monitored. An example security system 100 includes a central control panel 110 that communicates with a number of sensors via a wired or wireless path. For example, the control panel 110 may receive signals from motion sensors 125 that detect when a person enters a room. Signals received from fire sensors 130, such as smoke or heat sensors, indicate that a fire has been detected. Signals received from window and door sensors 135 indicate that a window or door has been opened.

Signals received from a peripheral user interface device 140, e.g., including a keypad and display, may arm and disarm the system, as well as trip an alarm via a panic button feature. The user interface device 140 may be the primary interface between the human user and the security system 100. The user interface device 140 typically includes components that are analogous to the control panel 110, including a control, memory and power source. Optionally, the user interface device 140 includes a transceiver. The user interface device 140 is commonly provided as a wireless device to allow it to be permanently installed in the home without running wire, such as by affixing it to a wall or placing it on a table, for instance. Moreover, multiple user interface devices may be provided in a home, such as in different rooms. The control panel 110 generally is a larger component that may be installed in an unobtrusive location in the home, such as a closet or basement. However, it is not necessary for the user interface device 140 to be separate from the control panel 110, or to communicate by wireless signals with the control panel 110. For example, the user interface device 140 may be integrated into the control panel 110.

Various other components may communicate with the control panel 110, such as a wireless key fob that is used to trip an alarm. The control panel 110 may also transmit signals to components of the security system 100. For example, signals may be transmitted to a siren 120 to activate the siren when an alarm condition is detected. Signals may be sent to the user interface device 140 to display status information to the user, such as whether the system is armed or disarmed, or whether a specific door or window has been opened. The control panel 110 may also have the ability to notify local emergency services of an alarm condition via a telephone dialer 122.

To facilitate installation and avoid the need to install wiring in a home, wireless security system components may be employed. Some components only transmit or receive. For example, the motion sensors 125, fire sensors 130, and window and door sensors 135 typically only transmit back to the control panel 110 when they are tripped, while the siren 120 only receives a signal from the control panel 110 when the control panel 110 detects an alarm condition based on a signal received from one of the sensors. The user interface device 140 may have both transmit and receive capabilities to communicate with the control panel 110. The wireless security system components may use radio frequency (RF) signals. One system uses signals at 345 MHz to provide a nominal indoor range of 200 feet. Different manufacturers may use different proprietary schemes for communicating data. For example, different coding and modulation techniques may be used. Components provided by Honeywell Corp. may advantageously be used.

The control panel 110 includes a transceiver (transmitter and receiver) 112 for transmitting and receiving wireless signals. The control 114 includes a microprocessor that may execute software, firmware, micro-code or the like to implement logic to control the security system 100. The control panel 110 may include a non-volatile memory 115 and other additional memory 116 as required. A memory resource used for storing software or other instructions that are executed by the control 114 to achieve the functionality described herein may be considered a program storage device. A dedicated chip such as an ASIC may also be used. Generally, each wireless component of the security system must be "learned" by the control 114. In the learning process, data is stored in the non-volatile memory 115 that identifies the characteristics of each sensor, including the sensor type, serial number or other identifier, and what type of action to take based on signals received from each sensor. For example, the action may be to provide a status message to the user, store data for subsequent maintenance purposes, or trip an alarm. A power source 118 provides power to the control panel 110 and typically includes a battery backup to AC power.

According to one aspect of the invention, one or more vehicle control systems 180 are integrated into an existing security system. That is, existing wireless communication components and transmitting and receiving protocols of the control panel 110 and/or user interface device 140 can be used. The appropriate control logic can be implemented as the control panel 110 and/or user interface device 140 are upgraded.

The vehicle control system (VCS) 180 is shown in FIG. 1 receiving a wireless signal from the transceiver 112. The VCS 180 may perform certain actions in response to the signal. Note that the VCS 180 could also receive wireless activation signals from a transceiver associated with the user interface device 140. The range of the wireless activation signals may be improved by using multiple transmitters and/or repeaters as needed in a building such as a larger home or business facility, for example. The VCS 180 also sends a signal to the transceiver 112 which may include status information relating to the vehicle. This includes status information relating to the VCS itself.

The user interface device 140 may include a microprocessor that executes software, firmware, micro-code or the like stored in memory, or a dedicated chip such as an ASIC, to control the security system 100. Thus, the intelligence for communicating with the VCS 180 can be carried out at different locations in the security system 100, such as at the control panel 110 and at one or more peripheral user interface devices 140. For example, the user interface device 140 can send commands to the control panel 110, such as to command the transceiver 112 to transmit a signal to the VCS 180. Similarly, the transceiver 112 can relay a signal from the VCS 180 to the user interface device 140. At the same time, the user interface device 140 can command its own local transceiver to transmit a signal to the VCS 180. The user interface device 140 can also relay a signal from the VCS 180 to the transceiver 112. Or, the control panel 110 can command its transceiver 112 and a transceiver in the user interface device 140 to transmit a signal. When multiple user interface devices 140 are used, it may be preferable for the centralized control panel 110 to act as the primary intelligence in the system 100.

Figure 2:
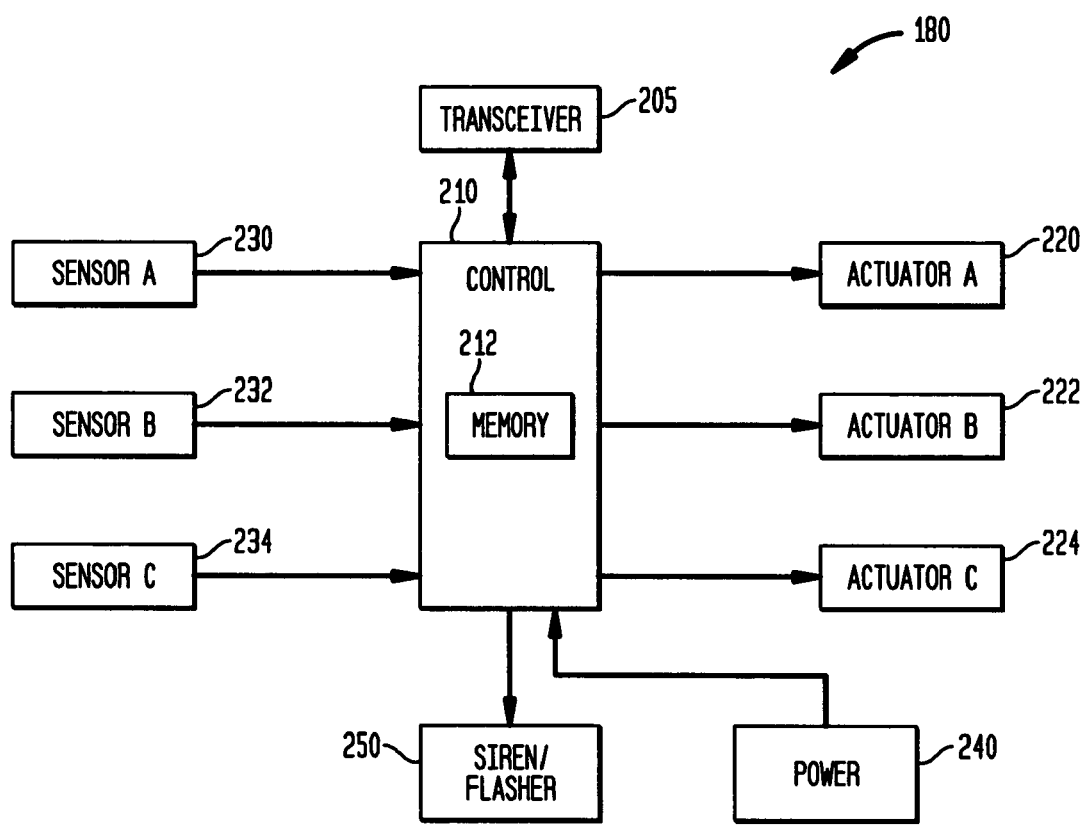
FIG. 2 illustrates an overview of an example vehicle control system, according to the invention.

FIG. 2 illustrates an overview of an example VCS, according to the invention. The VCS 180 includes components that are carried within a vehicle such as an automobile. However, the invention is suitable for use with other vehicles, including motorcycles, recreational vehicles, snowmobiles, tractors, bicycles and the like. Boats and other watercraft can be accommodated as well, whether on a trailer or in the water. For example, a boat docked at a waterfront home can interface with the home's security system. The status information and components that can be controlled will vary according to the type of vehicle and the vehicle's equipment. Moreover, the home security system can interface with multiple vehicles of the same type, or of different types. Each vehicle is provided with its own VCS 180. The VCS 180 can be located anywhere in the vehicle, such as under the dashboard or hood, or in the trunk, for instance.

The VCS 180 includes a transceiver 205 for receiving wireless signals from, and transmitting wireless signals to, the home security system 100, e.g., the transceiver 112 of the control panel 110 or user interface device 140. The transceiver 205 may have a built-in antenna for this purpose. The wireless signal may be provided according to any desired encoding and modulating scheme. A control 210 decodes the received wireless signal as required to obtain data from it. The data may include commands, for example, for controlling any one of a number of actuators in the vehicle, such as actuator A 220, actuator B 222, and actuator C 224. The actuators may be associated with different systems or components in the vehicle. For example, the actuators may be used to control a door lock/unlock component, a window open/close component, an engine start/stop component, and an interior climate control or window defrost component. Such components are known per se and are available as original equipment or aftermarket equipment on vehicles.

A transmitter may be provided in place of the transceiver 205 to send status information, such as an indication that an alarm has tripped in the vehicle, to the home security system 100. In this case, the vehicle is not controlled from the home security system 100. For example, in a low cost implementation, the control 210 is connected in series to the interior light circuit, e.g., dome light, of the vehicle. When a door is opened, the interior light circuit is closed, thereby causing the control 210 to activate the transmitter to send an alarm signal to the home security system 100.

A memory 212 may be used by the control 210 as a working memory, as well as for storing status information of the vehicle. In particular, the memory 212 may be used for storing software or other instructions that are executed by the control 210 to achieve the functionality described herein, in which case the memory 212 may be considered a program storage device. The control 210 may receive data from one or more sensors in the vehicle, such as sensor A 230, sensor B 232, and sensor C 234. The sensors may be associated with the different systems or components in the vehicle mentioned above, such as the door lock/unlock component, window open/close component, and engine start/stop component. The door component encompasses, e.g., passenger doors, a hatch, trunk lid, sliding van door, convertible top, etc. The window component encompasses, e.g., conventional passenger door windows, rear hatch window, and analogous structures such as sunroofs. The actuators and sensors can be powered by the vehicle's battery, or a separate backup battery. The actuators and sensors can be electrically connected so that they receive the necessary power even when the ignition is off.

The control 210 may be a microprocessor or ASIC, for example. A power source 240 may be a small Lithium battery that powers the control 210 and memory 212. The control 210 may activate a siren/flasher 250 to provide an alarm when an intrusion is detected, such as by detecting a door opening or the sound of breaking glass, via one of the sensors, when the control 210 is in an armed state.

Whenever the VCS 180 is within radio range of the home security system 100, the two systems can communicate with one another. The range should be sufficient to allow communication when the vehicle is parked in a typical location near or within a home, such as in an attached or detached garage. This communication allows many security, safety and convenience features to be realized. Advantageously, the VCS 180 can be monitored by the home security system 100 as if it is was another zone in the home. For example, when the home security system 100 is armed, a signal can be sent to arm a vehicle security system implemented by the VCS 180. Moreover, an alarm condition at the vehicle that is detected by the VCS 180 can be communicated to the home security system 100 to allow it to take action such as tripping the home's local alarm, e.g., by activating the siren 120 and dialing an alarm monitoring service via the dialer 122. Other commands can be provided to the VCS 180 to control, for example, the door lock/unlock component, window open/close component, and engine start/stop component. The commands can be provided automatically, for example, based on a schedule or the detection of other events. For instance, the VCS 180 can be automatically armed during at night, and the doors can be locked and windows closed. Or, the commands can be provided according to a user input. For example, the user can send a command to close the windows of the vehicle when rain is noted. Or, the user can send a command to start the engine of the vehicle to warm up the car on a cold day while the user remains in the home.

Status information can be provided from the VCS 180 to the home security system 100 regarding, e.g., whether the VCS 180 is armed, whether an alarm was tripped previously and reset, or is currently tripped, or a door was opened and closed, or the VCS 180 was tampered with, along with maintenance information such as whether there is a low battery condition in the power source 240.

Furthermore, the presence, arrival and departure of the vehicle relative to the home can be detected by the home security system 100. For example, the home security system 100 can periodically poll the VCS 180 to verify its presence within the radio range by a return signal. If no return signal is received, the home security system 100 ascertains that the vehicle has departed. The arrival and presence of the vehicle can be ascertained when a return signal is again received by the home security system 100. An alarm such as a bell or tone may be activated to alert the user of the arrival or departure of the vehicle. Historical data may be stored by the home security system 100 regarding the presence, arrival and departure of the vehicle.

Figure 3:
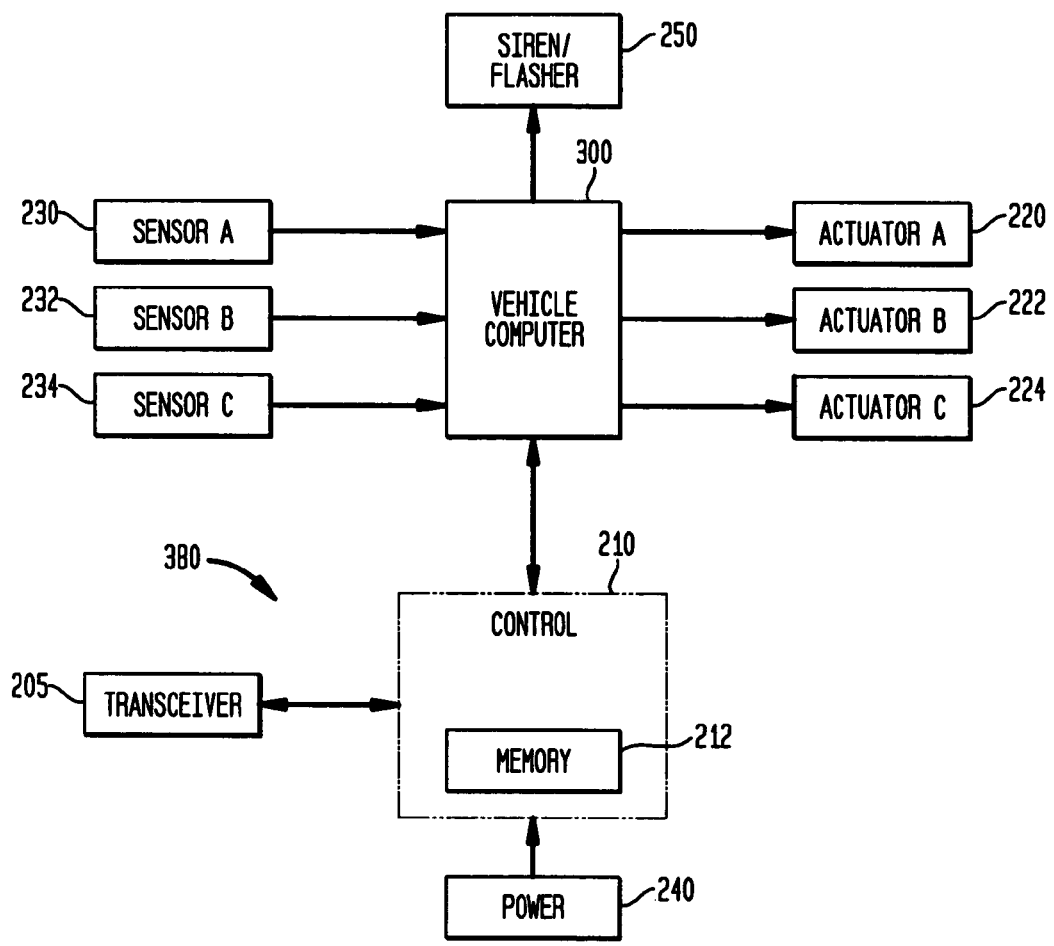
FIG. 3 illustrates an overview of an example vehicle control system that interfaces with a vehicle computer, according to the invention.

FIG. 3 illustrates an overview of an example vehicle control system (VCS) 380 that interfaces with a vehicle computer, according to the invention. The VCS 380 can interface with existing systems in the vehicle. For example, a vehicle may have a vehicle computer 300 that receives data from sensors, e.g., sensor A 230, sensor B 232, and sensor C 234, and controls actuators in the vehicle, such as actuator A 220, actuator B 222, and actuator C 224. The vehicle computer 300 may also control the siren/flasher 250. Also, it is possible for the same or different sensors and actuators to communicate with both the vehicle computer 300 and the control 210 of the VCS 380.

Furthermore, the VCS 380 can communicate with any number of other controls. For example, VCS 380 may communicate with a control for an engine start/stop component, e.g., to control the component to start or stop the engine, and to receive data from the component indicating whether or not the engine is running. The VCS 380 may also communicate with a control for a separate vehicle security system, e.g., to arm or disarm the security system, and to receive data from the component indicating whether or not the alarm was previously tripped and reset, or is currently tripped, or regarding another condition such as a malfunction.

Figure 4:
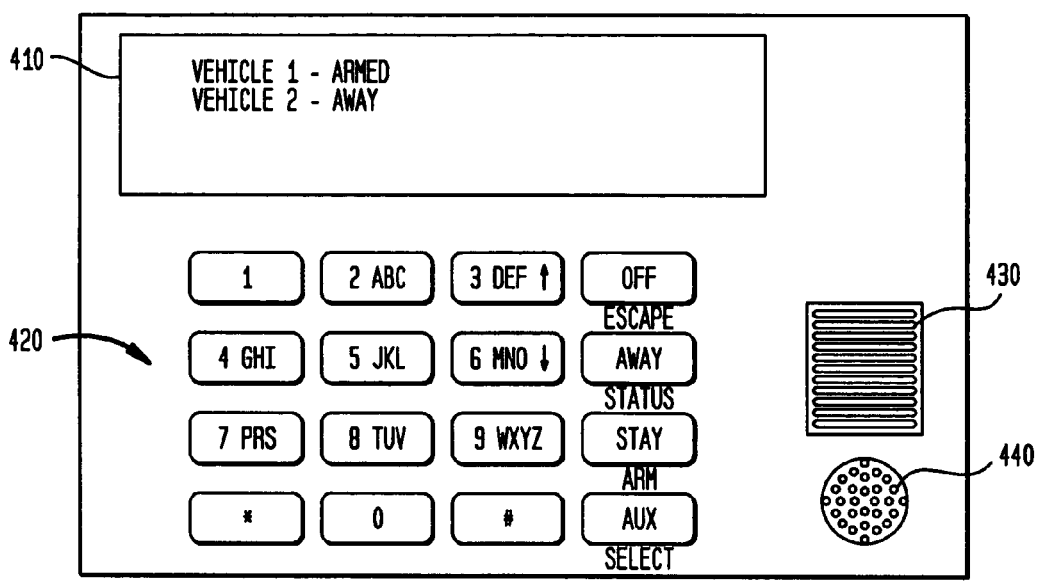
FIG. 4 illustrates an example user interface, according to the invention.

FIG. 4 illustrates an example user interface, according to the invention. As mentioned, the user interface device 140 can be provided, e.g., as a peripheral to, or a part of, the main control panel 110. The exact arrangement of components is transparent to the user. Thus, the functionality that is described herein as being provided by a user interface device may be provided wholly locally to the device 140, or partially remotely, such as at the associated control panel 110. The user interface device 140 includes a user input component such as a keypad 420 and/or microphone 440 for speech recognition in a voice-activated system, and a user output component such as a display 410 and/or speaker 430. The display 410 may be a multi-line, multi-character LCD display, for instance. The display 410 can provide a graphic device such as a cursor or other highlight to allow the user to select a particular vehicle using a "select" key to obtain additional information or options. In the example shown, the display 410 indicates that a first vehicle is armed and a second vehicle is away from the home.

Advantageously, the user interface device 140 may be of the type that is used for controlling a home security system so no re-design, e.g., to provide additional keys on the keypad 420, is necessary. In particular, functions can be assigned to existing keys to accommodate the functionality of the present invention. Each key can have more than one function as well by employing double function or soft keys. In one possible example, the "off" key has the additional function of "escape", the "away" key has the additional function of "status", the "stay" key has the additional function of "arm", and the "aux" or auxiliary key has the additional function of "select". Each of the additional functions can be accessed by pressing a "shift" or "function" key or the like, or by simply entering a specific mode. Optionally, dedicated keys can be provided for the vehicle control and status functions.

Control logic associated with the user interface device 140 allows it to control both the conventional home or other building security system components, while also communicating with the VCS to send commands and receive status information. Note that it is also possible for the VCS to send commands to the home security system, and receive status information from the home security system. For example, when a user is returning to the home in the vehicle, the VCS may receive status information from the home security system 100 indicating that an intrusion was detected in the home, in which case the user may decide it is not safe to enter the home, and turn around. Any appropriate menu display scheme and logic may be used.

In one approach, the home security system 100 is setup with a wireless zone for monitoring the vehicle. By setting up the zone as a perimeter, with the panel armed, or as 24-hour zone, which is always armed, an alarm can be triggered by the home security system 100 if a status signal is received from the VCS 180 indicating that an alarm has been tripped.

The following information provides an outline of a specification for implementing the invention.

1. Vehicle Partition

The home security system 100 allows the VCS 180 to function as a partition on the residence alarm panel, e.g., control panel 110. The control panel 110 can send commands to the VCS 180 to perform functions such as arming and disarming the vehicle security system, starting or stopping the engine, opening the trunk, turning on the lights, and so forth, from the user interface device 140 or a portable device such as a key fob. The user interface 140 displays the alarm status of the vehicle and uses the main system dialer 122 to report vehicle alarms. In essence, the panel provides a RF pipeline to the vehicle.

With vehicle partitioning, an RF transmitter (alone, or part of the transceiver 205), is mounted in the vehicle, e.g., under the dashboard, under the hood, on a window, etc. In the control panel 110, a wireless zone is set up with information including zone type, loop number, and serial number. A report code and zone descriptor can also be programmed in, if desired. When the panel is armed and the vehicle is moved in any way, for instance, this will cause that zone to go into alarm. If a 24-hour zone type is used, arming isn't necessary. Depending on the zone type, the user interface 140 and sounders 120 will sound. Reporting to a central station can also be configured via the dialer 122. The alarm can be silenced by the user entering in a four digit user code, for instance, and pressing the "off" key on the user interface 140, or sending a disarm command from a wireless key fob. The transmitter may also report low battery and tamper supervision status information.

Advantageously, an existing vehicle alarm system can be interfaced directly to a control panel 110 that supports partitioning. This interface is effectively an RF link, and the vehicle is a mobile partition. When the vehicle is in close proximity to the panel 110, it will be supervised by the panel as would any other partition. The user will be able to view the vehicle partition directly from any keypad or other user interface device with a "goto" function, or the auto partition will default to the existing partition. The alarm and other status information from the vehicle will be sent to the control panel 110. The alarm may be silenced by entering in a four digit user code and pressing the "off" key in the user interface 140, or sending a disarm command from a wireless key fob assigned also to that partition. Reporting to central station can also be configured via the dialer 122.

Furthermore, a vehicle alarm system can be designed to facilitate interfacing with the control panel 110 of the home security system 100. Such an alarm system will function the same as any other auto alarm in that it will have a zone that will protect the vehicle, and a user interface device and/or a key fob for arming and disarming. When an alarm condition is detected at the vehicle, the vehicle alarm will sound its own siren and flash the vehicle's lights, for instance. Moreover, if the vehicle is within RF range of the control panel 110, the vehicle alarm and the control panel will establish an RF link for communication. Panel sounders 120 will also sound and report the alarm to a central station if desired. This feature is particularly useful since conventional car alarms are often ignored.

1.1 Vehicle Partition Assignment

The control panel 110 may provide a feature called a "vehicle partition." This feature will dictate the partition under which the vehicle status information will be viewed. Any partition may be programmed as a vehicle partition. If the user has more than one vehicle, then each vehicle may be assigned to its own partition. The vehicle alarm will be programmed with the respective partition number, allowing more than one vehicle to report to the home security system 100.

1.2 Vehicle Keypads

Keypads, such as user interface 140, assigned to the auto-partition will display the status of the vehicle partition. A user, which is programmed to operate in the vehicle partition, will also be able to perform the functions such as arming and disarming, etc.

1.3 Shared Partitioning

When this feature is not programmed, the status of the vehicle partition can be viewed only from a user interface device programmed to the vehicle partition. If the feature is programmed, the user can log onto the vehicle partition from another partition user interface device. This may occur when there are multiple keypads, e.g., user interface devices 140, in the home. The GoTo feature has to be setup for that user code.

1.4 Vehicle Supervision

The home security system 100 will supervise the VCS 180 while it is in range of the home security system 100. This means that it will monitor the RF connection to the vehicle. When the vehicle is started, it will send a signal to the home security system 100 indicating that it is leaving and should not be supervised any longer. When the vehicle returns, and the engine is shut down, it will signal the home security system 100 to begin supervision once again. If the home security system 100 loses the connection with the vehicle while it is being supervised, it will initiate a vehicle supervision trouble condition. This will include a user interface device 140 display, sounder and central station transmission, if programmed. The system will also supervise and report if programmed low battery and tamper conditions are detected.

1.5 Vehicle Normal Status (Disarmed)

The auto alarm will contain zones as does the home security system 100. In the disarmed state, as zones of the vehicle are violated, the user interface device 140 will reflect this status, the same as the hardwired zones of the system. The user interface device 140 will also reflect the disarmed status of the vehicle with "system ready" and "not ready" displays. The user interface device 140 will also have some indication that it is referring to zones of the vehicle for the user with a vehicle descriptor.

1.6 Vehicle Arm/Disarm Bypass and Other Operations

Arming and disarming will be the same as with the home security system. When the user wishes to arm or disarm, he can do so if authorized, and he enters a valid code at a user interface device assigned to the vehicle partition. When the system is in a shared environment mode, it will be necessary for the user to switch to the vehicle partition with a keystroke first, before performing the arm/disarm functions. Bypassing of a zone on the vehicle will also be performed the same as with any other hardwired zone.

1.7 Vehicle Status Armed

When the vehicle is armed, a status will be displayed on the user interface device 140 assigned to the vehicle partition.

1.8 Alarm/Trouble Condition

When there is an alarm or trouble condition on a vehicle, the system will display this condition at all the user interface devices 140 in that partition, when there is more than one user interface device, the same as with any other alarm or trouble condition in a partition.

1.9 Central Station Reporting

The main home security system 100 dialer 122 will report to a central station, such as an alarm monitoring facility, whenever there is a violation of a zone assigned to the vehicle partition. The dialer 122 will report all events to the central station, the same as with any other partition of the system.

1.10 Trunklock

When enabled, this feature allows the user to open the vehicle's trunk from inside the home via the home security system 100.

1.11 Door Lock

When enabled, this feature allows the user to lock or unlock the vehicle's doors from inside the home via the home security system 100.

1.12 Starting Vehicle

When enabled, this feature allows the user to start or stop the vehicle's engine (including a gas engine or electric motor) from inside the home via the home security system 100. The user may be required to enter a set of keystrokes to start the vehicle, and a warning message may prompt the user to ensure that it is safe to start the engine.

1.13 Vehicle Event log

All alarm and trouble events that occur on the vehicle are maintained in the system event log, for later recall by the user interface device 140 or downloader.

Vehicle Linking

The following list of items describes various features that can be implemented in a vehicle-linking function.

2. Vehicle to House

2.1 Number of Vehicles

Multiple vehicles may be accommodated over multiple partitions of the house control panel 110.

2.2 Vehicle Alarm Status (Vehicle to House)

The following items may be reported by the VCS 180 to the control panel 110, e.g., upon receiving a status request from the home security system 100, whether the request is automatically or manually provided: arm, disarm, not ready, doors, trunk, hood, bypass, alarm, trouble, vehicle event log, vehicle-alarm battery trouble, and supervision.

2.3 Automotive Status

The following list describes various status conditions regarding the vehicle that may be transmitted by the VCS 180 to the home security system 100: engine running, key left in ignition, windows (opened/closed), docking, leaving driveway (departing), entering driveway (arriving), ignition (on/off/accessory), lights (on/off), radio (on/off), door locks (on/off), and trunk lock (on/off).

2.4 Vehicle Alarm Functions (Commands Sent to the House Panel)

The following vehicle alarm functions can be sent to the home security system 100 from the VCS 180: arm partition, disarm partition, bypass, sound alarm (siren), cause panic alarm (including dial out), cause medical alarm, trigger output, X10 output, and send page via pager. X10 is a communications language that allows compatible products to talk to each other using the existing electrical wiring in the home.

2.5 Alarm/Trouble Conditions (Vehicle to House)

The control panel will have several programmable options dedicated to its output resources whenever there is either an alarm or trouble event from the VCS 180. The list of events below describes various events that can occur at the home security system 100 when a vehicle alarm or trouble condition is received: display message on user interface device 140, sound bell alarm, sound a buzzer alarm at the user interface device 140, initiate trigger/relay/X10 output, send alarm/trouble report to central station via dialer 122, send a report to a pager, send a report via long-range radio (LRR), and send a report via a computer network. When an alarm occurs at the vehicle, and that event is reported to the home alarm, the home alarm will decide what outputs to perform based on predefined system programming.

3. House to Vehicle

3.1 House Alarm Status

The following items may be reported to the VCS 180 by the home security system 100 upon receiving a status request from the VCS 180, whether the request is automatically or manually provided: arm, disarm, not ready, bypass, alarm, alarm memory, trouble, event log, panel battery trouble, and supervision.

3.2 House Alarm Functions—Vehicle Security System

The following items can be performed by the VCS 180 upon receiving a request from the house alarm: arm, disarm, bypass, sound alarm (siren), and trigger output.

3.3 House Alarm Functions—Automotive System

The following items can be performed by the automotive system, e.g. vehicle computer 300, upon receiving a request from the home security system 100, e.g., via the VCS 180: start vehicle, lock/unlock all doors, change state of windows, open trunk, on/off vehicle lights, and sound horn.

3.4 Alarm/Trouble Conditions (House to Vehicle)

When an alarm occurs in the home, that event may be reported to the VCS 180, instructing it to perform various services. The vehicle alarm will prioritize these signals with its own events. The house control panel 110 may have several programmable options dedicated to the vehicle output resources whenever there is either an alarm or trouble event in the house. The following events may occur at the VCS 180 when it receives a house alarm or trouble condition from the home security system 100: display message on vehicle keypad LCD, sound vehicle security alarm siren, sound automotive horn, flash headlights and taillights, and use a cell phone or other communication link to call a central station.

3.5 RF Pipe

High-end partition panels may support an RF vehicle partition so that the end user can use the user interface device 140 to obtain system status information and perform the same tasks as would be done with any other partition.

4.0 Event Types

Various buttons on the user interface device 140 or a key fob may be used to control different functions as follows.

a) Arm Vehicle Partition

This button will cause the control panel 110 to arm the vehicle partition. The vehicle partition map can be set up so that a button will arm any or all of the vehicle partitions. Thus, one key can be used to arm all of the vehicles in the proximity of the house. If only one partition is enabled, then only that vehicle will be armed.

b) Disarm Vehicle Partition

This button will cause the control panel 110 to disarm the vehicle partition. The vehicle partition map can be setup so that a button will disarm any or all of the vehicle partitions. Thus one key can be used to disarm all of the vehicles in the proximity of the house. If only one partition is enabled then only that vehicle will be disarmed.

c) Toggle Vehicle Partition

This button will cause the wireless key fob to switch which vehicle or vehicles it is controlling. This will stay in effect until another toggle vehicle partition is executed. The vehicle partition map fields will define the toggle. The first map will switch with the second, and vice-versa.

d) Start Vehicle Partition

This button will cause the control panel 110 to start the vehicle partition. The vehicle partition map can be setup so that a button will start any or all of the vehicle partitions. Thus one key can be used to start all of the vehicles in the proximity of the house. If only one partition is enabled then only that vehicle will be started.

e) Shut Vehicle Partition

This button will cause the control panel 110 to shut the vehicle partition. The vehicle partition map can be setup so that a button will shut off any or all of the vehicle partitions. Thus one key can be used to shut off all of the vehicles in the proximity of the home. If only one partition is enabled then only that vehicle will be shut off.

Figure 5:
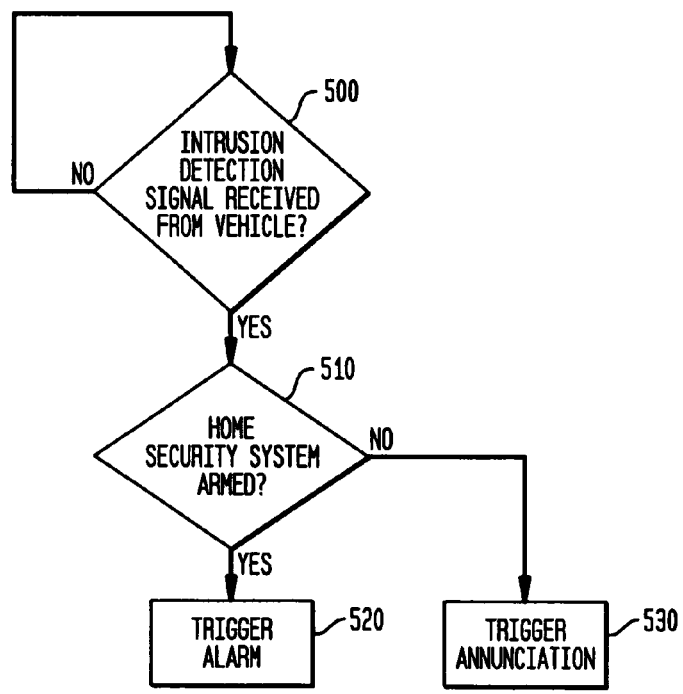
FIG. 5 illustrates an example method for monitoring a vehicle, according to the invention.

FIG. 5 illustrates an example method for monitoring a vehicle, according to the invention. In a further aspect of the invention, a remote vehicle monitoring system is provided that can be used independently of a home security system. In this approach, a monitoring apparatus with a receiver and control capabilities analogous to the control panel 110 is provided. The monitoring apparatus receives a wireless signal from a vehicle indicating a change in status of the vehicle, such as an intrusion detection (block 500). In a low cost embodiment, an RF transmitter is connected in series to the interior light circuit, e.g., dome light, of the vehicle. When a door is opened, the interior light circuit is closed, thereby causing the transmitter to send a signal to the monitoring apparatus. The monitoring apparatus handles the received signal according to its control mode. For example, the monitoring apparatus can trigger an alarm when it is in an armed control mode. Or, the monitoring apparatus can trigger an annunciation when it is in an unarmed control mode. The annunciation refers, e.g., to a tone, buzzer, voice, and/or control panel display that alerts the user to the change in status of the vehicle. Thus, the vehicle transmits the change in status signal, and the monitoring apparatus decides how to process it based on its control mode. The control mode can be configured by a user, for example, via an appropriate user interface.

Furthermore, the monitoring apparatus can be designed so that it is responsive to the status of a home or other building security system. For instance, the monitoring apparatus can be set to an armed control mode when the home security system is armed (block 510) so that the monitoring apparatus triggers the alarm (block 520) when the change in status signal is received from the vehicle. Similarly, the monitoring apparatus can be set to an unarmed control mode when the home security system is unarmed so that the monitoring apparatus only triggers the annunciation (block 530) when the change in status signal is received from the vehicle. A further distinction can be made according to whether the armed mode of the home security system is an "armed stay" mode or an "armed away" mode. The "armed stay" mode is used, e.g., when the user is in the home, such as when going to bed, while the "armed away" mode is used when the user leaves the home. Specifically, the monitoring apparatus can be set to an unarmed control mode when the home security system is in the "armed stay" mode, since presumably the user can observe the vehicle and call for help if needed when the monitoring apparatus annunciates the change in vehicle status. The monitoring apparatus can be set to the armed control mode when the home security system is in the "armed away" mode, The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A security apparatus, comprising:
at least one receiver located in a building for receiving at least one signal from at least one sensor located in the building for detecting an alarm condition in the building, and for receiving at least one wireless signal from a security system in a vehicle; and
a control located in the building and responsive to the at least one receiver for determining whether to trip an alarm according to the at least one signal from the at least one sensor and the at least one wireless signal from the security system in the vehicle.

2. The security apparatus of claim 1, wherein:
the control trips the alarm when the at least one wireless signal from the security system in the vehicle indicates that the alarm condition in the vehicle has been detected.

3. The security apparatus of claim 1, further comprising:
a user output device responsive to the control for providing a message to a user based on the at least one wireless signal from the security system in the vehicle.

4. The security apparatus of claim 3, wherein:
the message indicates whether an opening of a door has been detected in the vehicle.

5. A security apparatus, comprising:
at least one receiver located in a building for receiving at least one signal from at least one sensor located in the building and that detects an alarm condition in a the building, and for receiving at least one wireless signal from a vehicle that provides status information of the vehicle;
a control located in the building and responsive to the receiver; and
a transmitter located in the building and responsive to the control for transmitting at least one wireless signal to the vehicle comprising at least one command for controlling at least one component in the vehicle.

6. The security apparatus of claim 5, wherein:
the status information indicates at least one of: (a) whether a door is locked in the vehicle, (b) whether a door is open in the vehicle, and (c) whether a window is open in the vehicle.

7. The security apparatus of claim 5, wherein:
the status information indicates whether an alarm is armed in the vehicle.

8. The security apparatus of claim 5, wherein:
the status information indicates whether an alarm is triggered in the vehicle.

9. The security apparatus of claim 8, wherein:
the control triggers a local alarm when the status information indicates the alarm is triggered in the vehicle.

10. The security apparatus of claim 5, wherein:
the status information indicates whether an engine is running in the vehicle.

11. The security apparatus of claim 5, wherein:
the status information indicates whether there is a low battery condition in a component in the vehicle that maintains the status information.

12. The security apparatus of claim 5, wherein:
the status information indicates whether the vehicle is within a range of the at least one receiver.

13. The security apparatus of claim 5, wherein:
the at least one command comprises data for controlling at least one of locking and unlocking of a door in the vehicle.

14. The security apparatus of claim 5, wherein:
the at least one command comprises data for controlling at least one of arming and disarming of a security system in the vehicle.

15. The security apparatus of claim 5, wherein:
the at least one command comprises data for controlling at least one of starting and stopping an engine in the vehicle.

16. The security apparatus of claim 5, further comprising:
a user input device for receiving an instruction from a user;
wherein the control is responsive to the user input device for controlling the transmitter to provide the at least one command according to the received instruction.

17. The security apparatus of claim 5, further comprising:
a user output device responsive to the control for providing a message to a user based on the status information.

18. A security apparatus, comprising:
at least one receiver located in a building for receiving at least one wireless signal from a vehicle when the vehicle is within a range of the receiver;
a control located in the building and responsive to the receiver for determining when the vehicle is within the range of the receiver; and
a transmitter located in the building and responsive to the control for transmitting at least one wireless signal to the vehicle comprising at least one command for controlling at least one component in the vehicle when the control determines that the vehicle is within the range of the receiver.

19. The security apparatus of claim 18, wherein:
the at least one receiver receives at least one signal from at least one sensor that detects an alarm condition in a building.

20. The security apparatus of claim 18, wherein:
the at least one command comprises data for controlling at least one of arming and disarming of a security system in the vehicle.

21. A vehicle security apparatus, comprising:
a vehicle control system for maintaining status information of the vehicle;
a transmitter located in the vehicle and responsive to the vehicle control system for transmitting at least one wireless signal that provides the status information to a receiver of a security system, the security system detecting intrusion in a building, the security system and the receiver of the security system located in the building; and
a receiver located in the vehicle for receiving at least one wireless signal from the security system comprising at least one command for controlling at least one component in the vehicle;
wherein the vehicle control system is responsive to the receiver for controlling the at least one component according to the at least one command.

22. The vehicle security apparatus of claim 21, wherein:
the status information indicates at least one of: (a) whether a door is locked in the vehicle, (b) whether a door is open in the vehicle, and (c) whether a window is open in the vehicle.

23. The vehicle security apparatus of claim 21, wherein:
the status information indicates whether an alarm system is armed in the vehicle.

24. The vehicle security apparatus of claim 21, wherein:
the status information indicates whether an alarm is triggered in the vehicle.

25. The vehicle security apparatus of claim 21, wherein:
the status information indicates whether an engine is running in the vehicle.

26. The vehicle security apparatus of claim 21, wherein:
the status information indicates whether there is a low battery condition in the vehicle control system.

27. The vehicle security apparatus of claim 21, wherein:
the status information indicates at least one of an arrival and departure of the vehicle.

28. The vehicle security apparatus of claim 21, wherein:
the at least one command comprises data for controlling at least one of locking and unlocking of a door in the vehicle.

29. The vehicle security apparatus of claim 21, wherein:
the at least one command comprises data for controlling at least one of arming and disarming of a security system in the vehicle.

30. The vehicle security apparatus of claim 21, wherein:
the at least one command comprises data for controlling at least one of starting and stopping an engine in the vehicle.

31. The vehicle security apparatus of claim 21, wherein:
the at least one command comprises data for triggering an alarm in the vehicle when an alarm is triggered in the security system.

32. A vehicle monitoring apparatus, comprising:
at least one receiver located in a building for receiving at least one wireless signal from a vehicle indicating a change in status of the vehicle; and
a control located in the building and responsive to the at least one receiver for notifying a user, in accordance with a control mode, when the at least one wireless signal from the vehicle indicates that the change in status of the vehicle has been detected;
wherein the control is responsive to a status of a building security system.

33. The vehicle monitoring apparatus of claim 32, wherein:
the change in status of the vehicle comprises an intrusion detection.

34. The vehicle monitoring apparatus of claim 32, wherein:
the control notifies the user by triggering an alarm when the control mode is an armed control mode, and the at least one wireless signal from the vehicle indicates that the change in status of the vehicle has been detected.

35. The vehicle monitoring apparatus of claim 32, wherein:
the control notifies the user by triggering an annunciation when the control mode is an unarmed control mode, and the at least one wireless signal from the vehicle indicates that the change in status of the vehicle has been detected.

36. The vehicle monitoring apparatus of claim 32, wherein:
the control notifies the user by triggering an alarm when the building security system is armed, and the at least one wireless signal from the vehicle indicates that the change in status of the vehicle has been detected.

37. The vehicle monitoring apparatus of claim 32, wherein:
the control notifies the user by triggering an annunciation when the building security system is unarmed, and the at least one wireless signal from the vehicle indicates that the change in status of the vehicle has been detected.

* * * * *